Patented Nov. 3, 1925.

1,560,465

UNITED STATES PATENT OFFICE.

CLARENCE M. CARSON, OF AKRON, OHIO, ASSIGNOR TO THE GOODYEAR TIRE AND RUBBER COMPANY, OF AKRON, OHIO, A CORPORATION OF OHIO.

METHOD OF TREATING RUBBER.

No Drawing. Application filed February 7, 1923. Serial No. 617,612.

*To all whom it may concern:*

Be it known that I, CLARENCE M. CARSON, a citizen of the United States, and resident of Akron, Ohio, have invented new and useful Improvements in Methods of Treating Rubber, of which the following is a specification.

My invention pertains to the manufacture of rubber and rubber compounds and it has particular relation to a novel method of introducing means for accelerating the vulcanization thereof.

The object of my invention consists in providing a method of introducing an accelerator to the rubber compound by introducing separately the elements or combinations of elements necessary to form the accelerator, and permitting the various elements to combine within the rubber compound.

In the manufacture of rubber and rubber compounds, conditions frequently obtain which result in the proper curing of the rubber requiring a relatively long period of time. Under such conditions it is highly desirable that an accelerator or activator be introduced to hasten the vulcanization and to reduce the period of time necessary therefor.

Heretofore, accelerators have been introduced into rubber compounds by mixing them with the compound during the milling process. This sometimes resulted in the rubber starting to cure immediately, which was undesirable.

My invention differs from the former practice in that the accelerator is introduced by means of a carrying agent, such as activated carbon, in a plurality of separate parts, any one of which alone is not an accelerator. My preferred method consists in milling into the rubber stock a quantity of activated carbon saturated or partially saturated with one element of an accelerator. The carbon itself preferably serves as a pigment and compounding ingredient. A second quantity of activated carbon is also milled into the rubber. This second portion of the carbon contains the remaining ingredients necessary to make the desired accelerator. The various ingredients of the accelerator are thereby brought into the same mass. Certain of such ingredients combine instantly during the milling process. Others will not combine until the compound is heated to a relatively high temperature, thus permitting fairly accurate control of the vulcanizing process.

There are a relatively large number of accelerators which may be introduced in this manner. For example, ammonia may be introduced in one quantity of activated carbon and a second quantity introduced also carrying a gas, such as formaldehyde, hydrogen sulphide or carbon dioxide. Again, the second quantity of carbon may be saturated with a liquid, such as acetaldehyde, furfurol, or carbon disulphide, all of which combine with the ammonia to make an accelerator. Also, one batch of carbon may contain diethylamine and a second batch with either carbon bisulphide or carbon dioxide. An additional example consists in saturating one quantity of the carbon with dimethylamine and a second quantity with carbon dioxide or carbon bisulphide. The combination of ammonia and formaldehyde appears to be the most desirable at the present time.

It may also be found to be desirable to mill one of the ingredients, in solid form, into the compound and subsequently introduce the other ingredients necessary to complete the accelerator by means of the activated carbon. For example, I may mill tetramethyl thiuramdisulfide into the compound and introduce ammonia by means of the activated carbon.

The term "carbon" or "activated carbon," as herein employed, is intended to designate any of the forms of carbon such as lamp black, gas black and the like, which have been activated irrespective of the source of derivation thereof. Also, the term "saturated," referring to the state of impregnation of the carbon with the rubber treating fluid, refers also to a state of partial saturation thereof.

It will be apparent to those familiar with the manufacture of rubber, that by my invention I have provided a positive and sure method of accelerating the curing of rubber which may be more accurately controlled than when the complete accelerator is combined with the rubber compound during the milling process. This is sometimes highly desirable where the lapse of time necessary between the milling of the compound and the final shaping of the product is of any considerable duration.

Although I have disclosed the basic principle of my invention, and have described a number of combinations which may be employed, it will be apparent to those skilled in the art that it is not so limited but that many minor modifications and changes may be made therein without departing from the spirit of my invention or from the scope of the appended claims.

I claim:

1. The method of treating rubber which comprises introducing a vulcanization accelerator thereinto in a plurality of separate parts by means of a carrying agent.

2. The method of treating rubber which comprises introducing a vulcanization accelerator thereinto by introducing components thereof individually by means of activated carbon.

3. The method of treating rubber which comprises introducing a vulcanization accelerator thereto by introducing the individual elements thereof contained in activated carbon.

4. The method of treating rubber which comprises milling thereinto an activated compounding ingredient containing a fluid and an additional activated compounding ingredient containing a second fluid which is adapted to combine with said first mentioned fluid to form a vulcanization accelerator.

5. The method of treating rubber which comprises milling thereinto an activated compounding ingredient one portion of which is saturated with one fluid and another portion of which is saturated with a second fluid which combines with the first mentioned fluid to form a vulcanization accelerator.

6. The method of treating rubber which comprises introducing thereinto a quantity of activated carbon saturated with ammonia and a second quantity of activated carbon saturated with formaldehyde.

7. The method of treating rubber which comprises milling one ingredient of an accelerator into the rubber, and milling in a second ingredient contained in activated carbon.

In witness whereof, I have hereunto signed my name.

CLARENCE M. CARSON.